Oct. 24, 1944.  G. L. DOW ET AL  2,360,855
METALLURGICAL FURNACE
Filed April 12, 1941  8 Sheets-Sheet 1
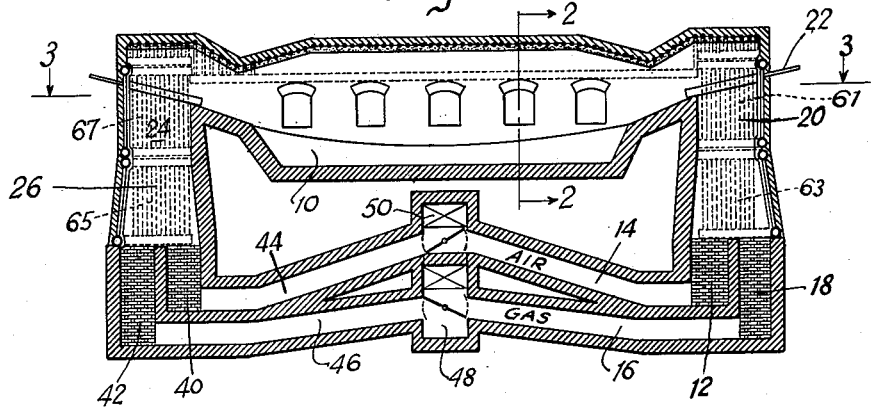
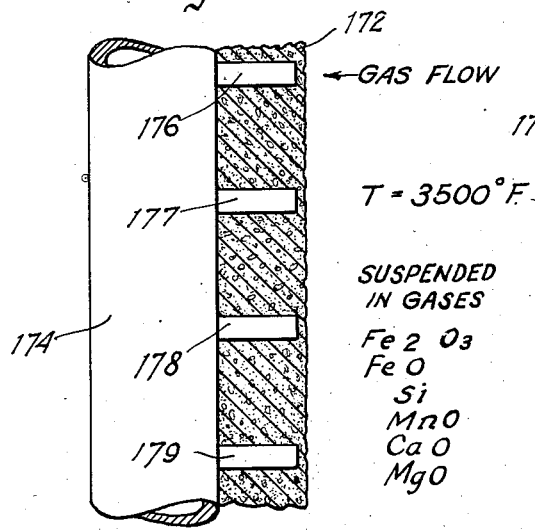
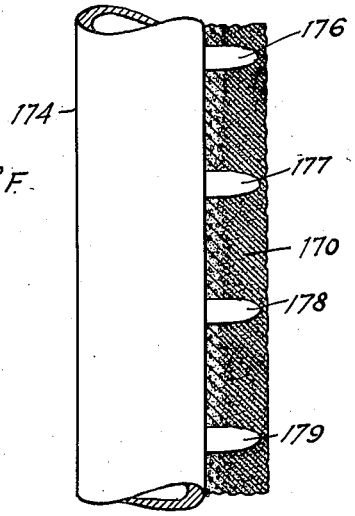
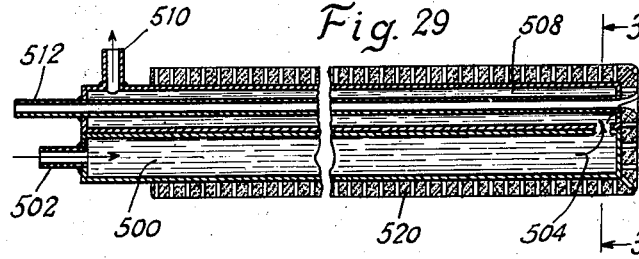
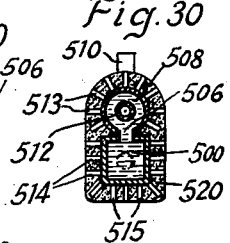
George L. Dow
Charles R. FonDersmith &
BY Arthur R. Waugaman
INVENTORS
R. M. Holbrook Attorney

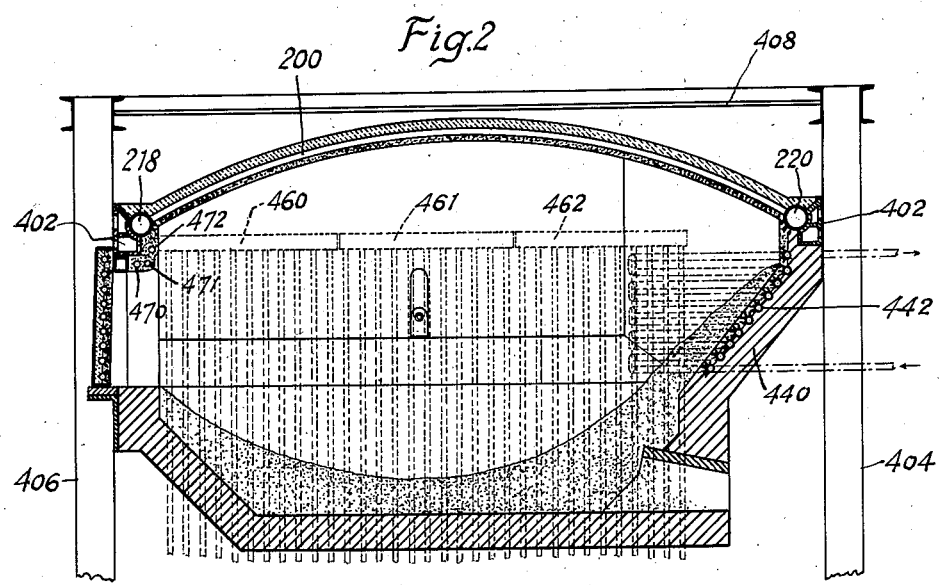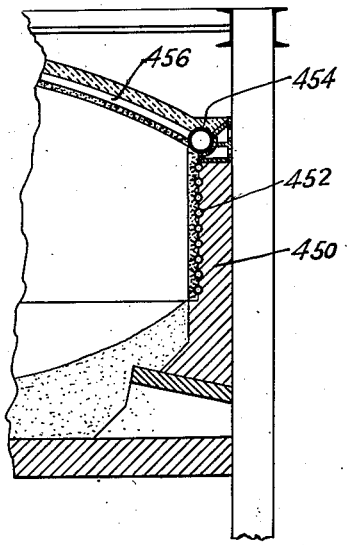

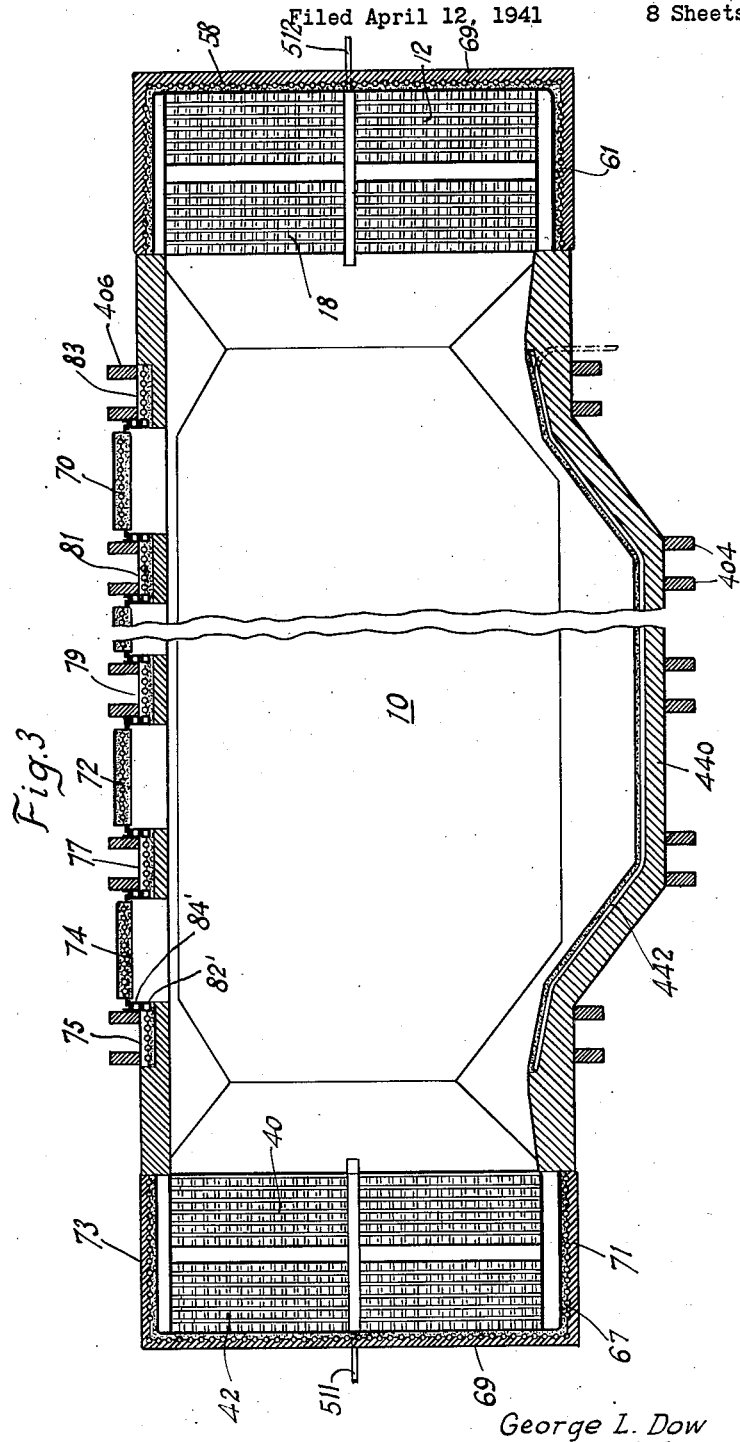

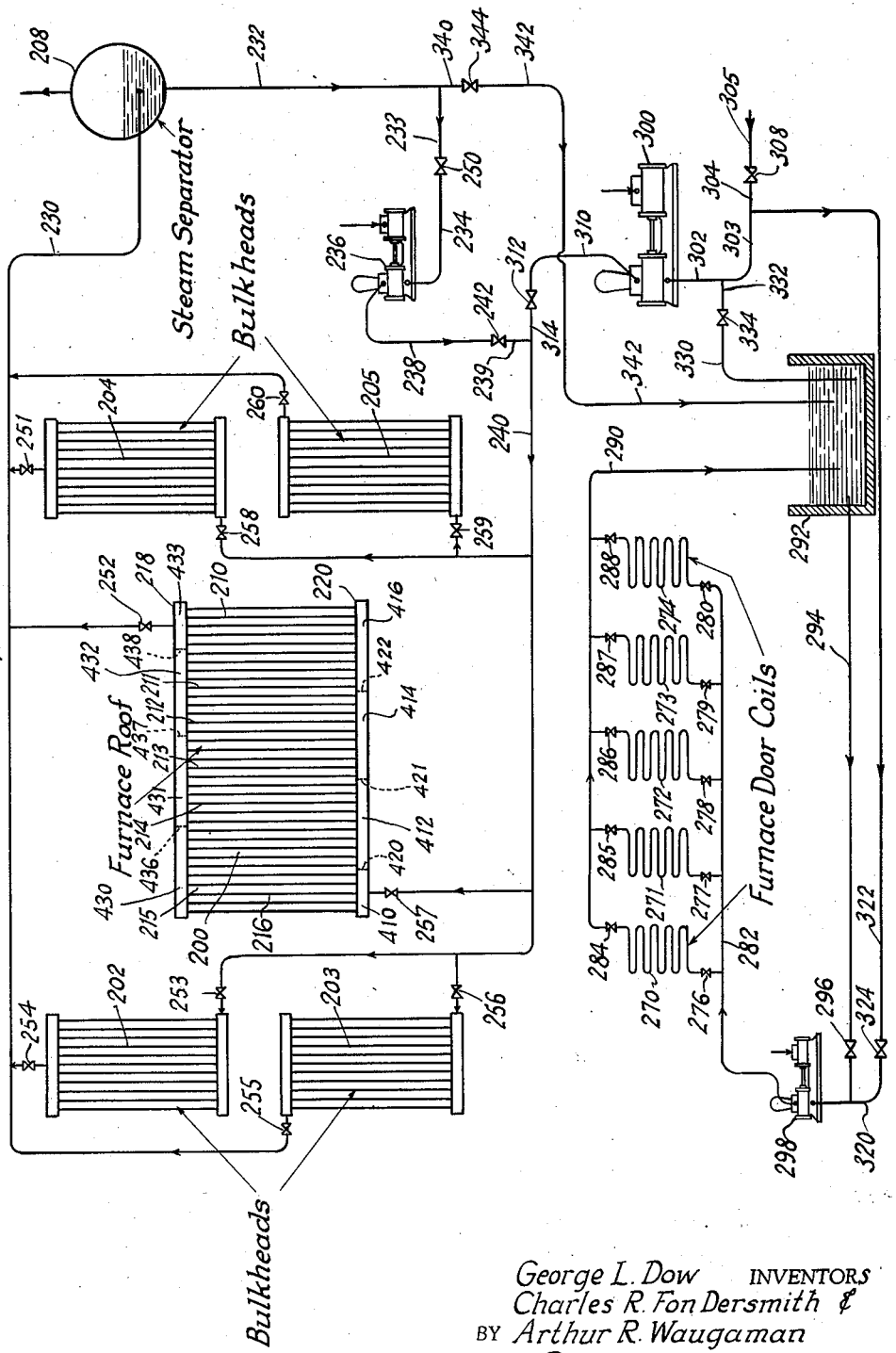

Oct. 24, 1944. G. L. DOW ET AL 2,360,855
METALLURGICAL FURNACE
Filed April 12, 1941 8 Sheets-Sheet 5
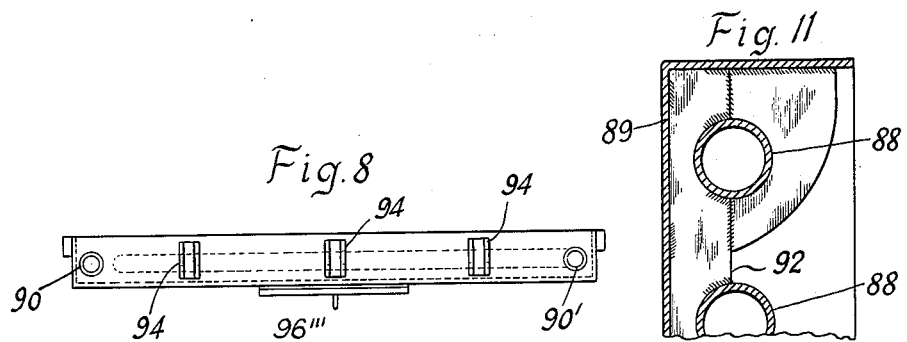
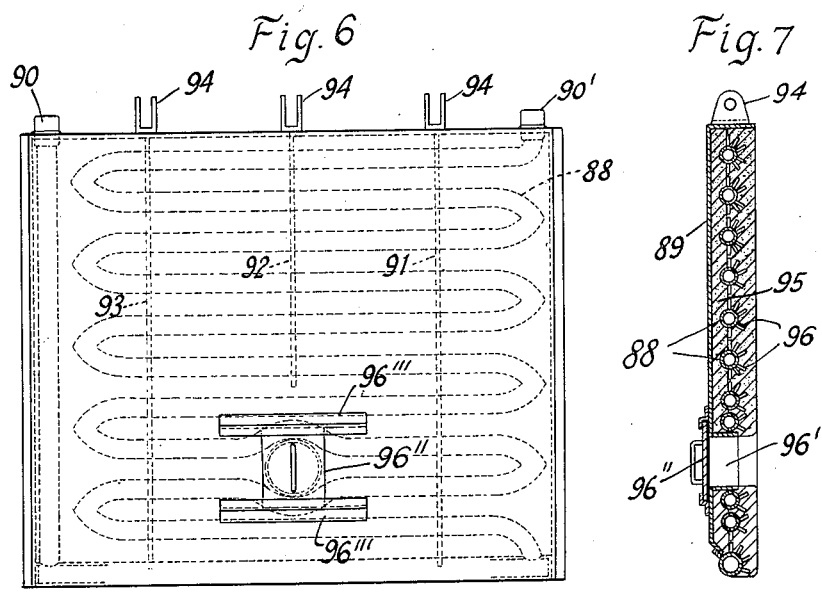
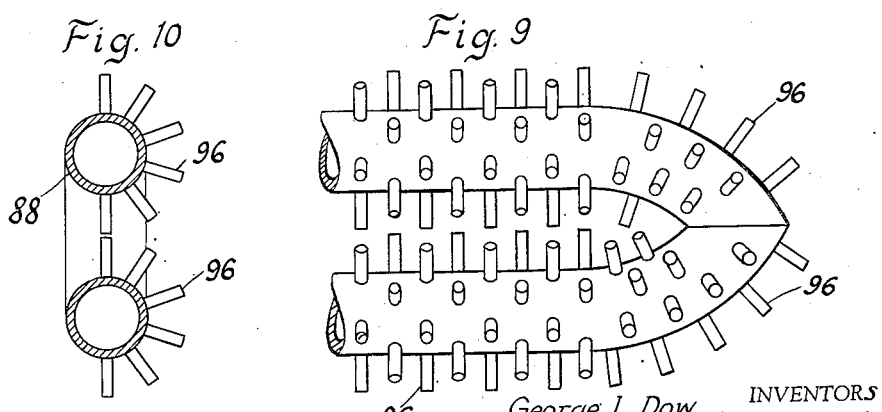
INVENTORS
George L. Dow
Charles R. FonDersmith &
BY Arthur R. Waugaman
R.W.Holbrook Attorney Oct. 24, 1944.  G. L. DOW ET AL  2,360,855
METALLURGICAL FURNACE
Filed April 12, 1941  8 Sheets-Sheet 6
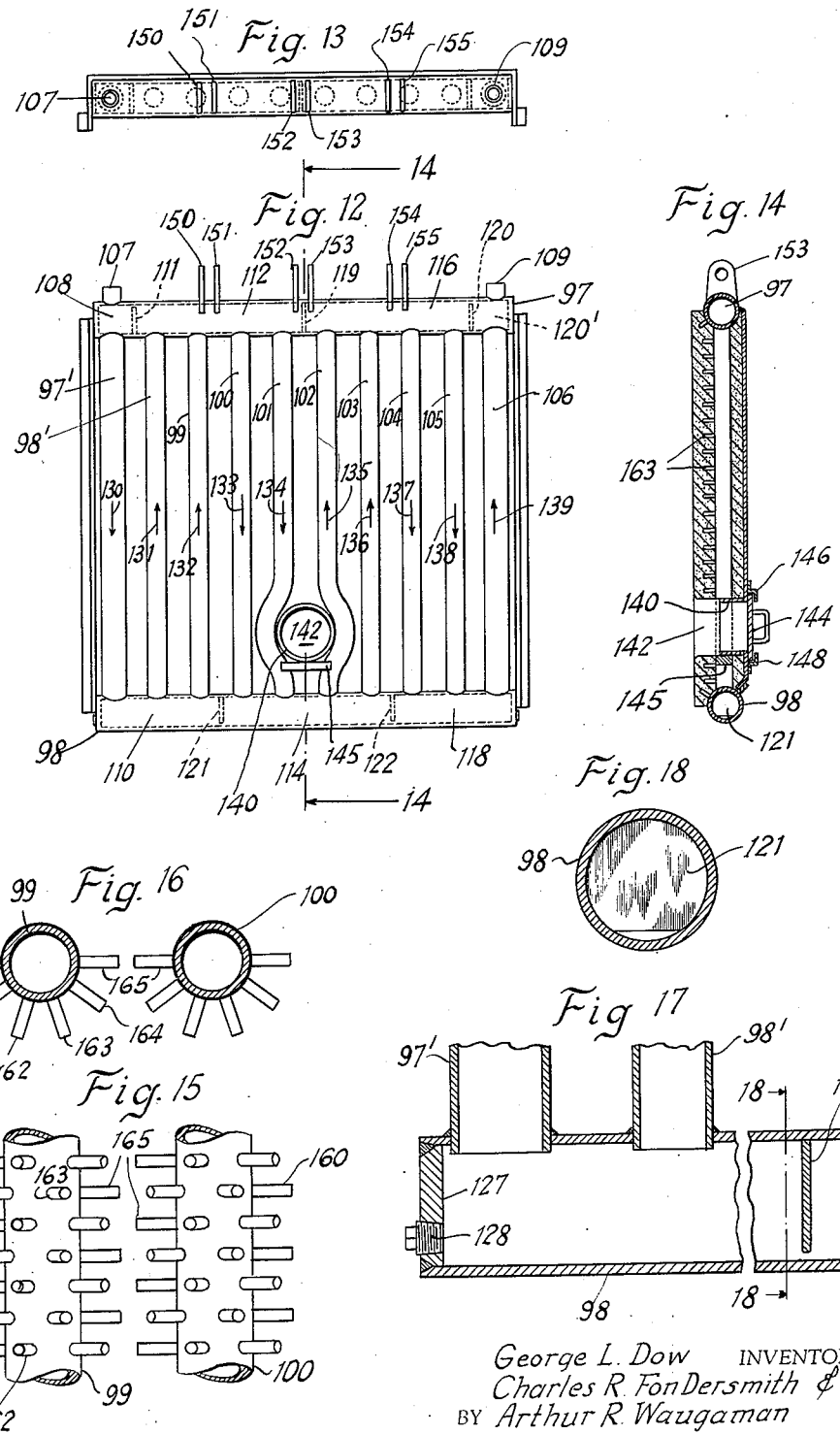
George L. Dow
Charles R. Fon Dersmith &
BY Arthur R. Waugaman
R. W. Holbrook  Attorney Oct. 24, 1944.    G. L. DOW ET AL    2,360,855
METALLURGICAL FURNACE
Filed April 12, 1941    8 Sheets-Sheet 7
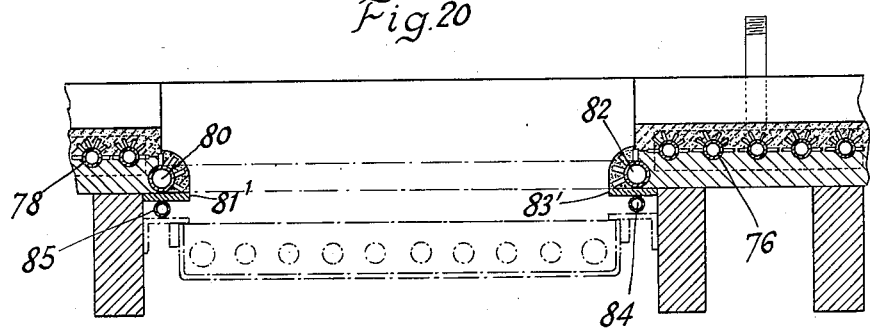
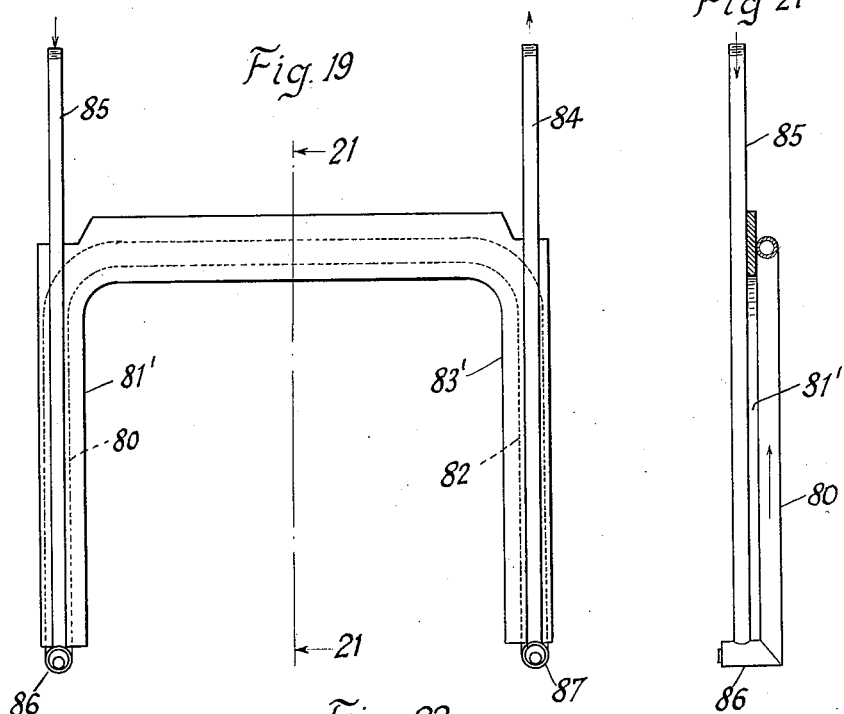
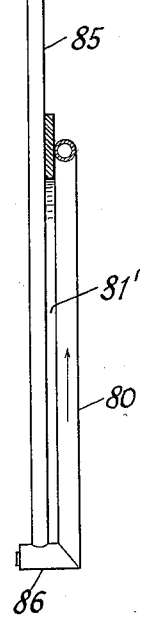
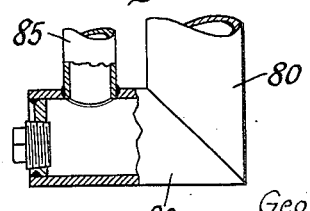
George L. Dow
Charles R. FonDersmith &
Arthur R. Waugaman  INVENTORS
BY R.W.Holbrook Attorney

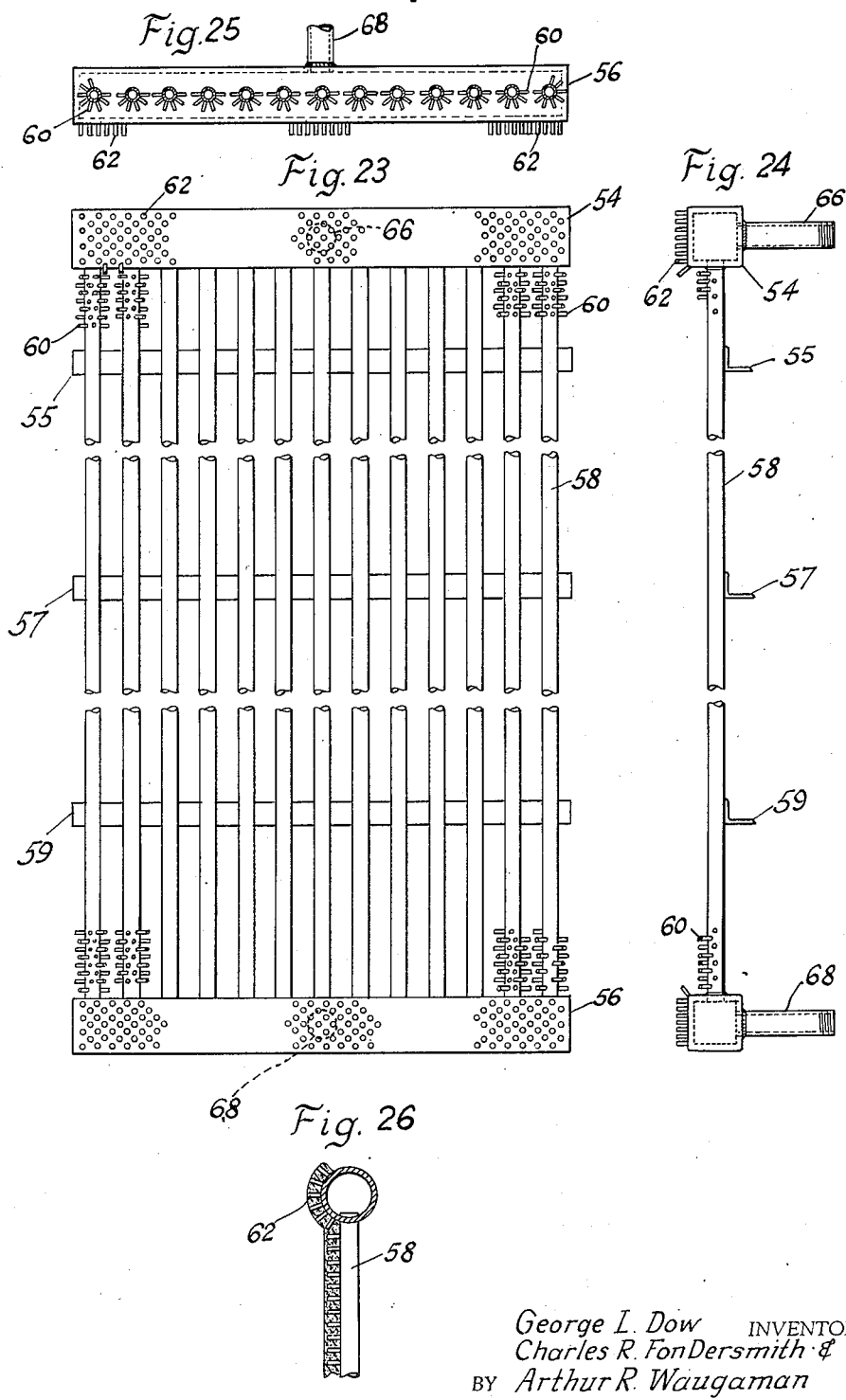

Patented Oct. 24, 1944

2,360,855

UNITED STATES PATENT OFFICE 2,360,855

METALLURGICAL FURNACE

George L. Dow, South Bend, Ind., Charles R. Fon Dersmith, Middletown, Ohio, and Arthur R. Waugaman, Grosse Pointe, Mich., assignors to The Babcock & Wilcox Company, Newark, N. J., a corporation of New Jersey Application April 12, 1941, Serial No. 388,202

10 Claims. (Cl. 266—24)

This invention is concerned with metallurgical furnaces, methods of constructing them, and methods of their operation.

In the operation of open hearth furnaces it is a paramount factor that high furnace temperatures be maintained. The efficiency of production methods and high quality of the product demand such temperatures, and, although the temperatures employed in prior art practice have been high enough to cause furnace maintenance costs to amount to increasing percentages of the total costs of open hearth steel production, still higher furnace temperatures were desirable. This result is attained by this invention.

The refractory boundary components of the prior art furnaces have been so damaged by a relatively small number of heats that they have had to be renewed frequently, and every repair of this kind has not only increased maintenance costs by amounts equal to the costs of the labor and materials but considerable time losses have been involved because of the necessary cooling of those components to working temperatures. Prior art furnaces have usually involved heavy refractory walls or other boundary portions of high heat storage capacity, and when it was necessary to repair such furnaces, the cooling periods were consequently of considerable length due to the great amount of residual heat. It is one object of the invention to provide an open hearth construction in which the wall components or other furnace boundary components have greatly reduced heat storage capacities. This attribute of the invention, as well as others, materially reduces "outage," or the time during which the furnace must be taken out of operation for the purpose of maintenance or repair.

It is an object of this invention to eliminate a great proportion of such increased costs of steel manufacture, by building the furnace in such a manner that its operation inherently decreases fuel consumption, and materially reduces furnace maintenance costs, while, at the same time, it increases furnace temperatures.

In the operation of many regenerative open hearth furnaces fired by gas and air, there is, in the heating operation from the burner ports at one end of the furnace, a flow of high temperature air and gas to the burner ports and through a flue (or uptake) bounded by walls which may be referred to as bulkheads. The air is at a temperature of the order of 2000° F. Simultaneously, the gases leaving the furnace through the opposite ports, pass downwardly through a corresponding flue or downtake, to the regenerator and these gases leave the furnace at temperatures usually in excess of 3000° F. The furnace is reversed so that a port which has been a firing port in the first action becomes a gas outlet port in the reverse action, and these reversals take place at frequent intervals such as every fifteen or twenty minutes.

In such regenerative and reversing action the gas uptakes and downtakes are alternatively subjected to the flow of gases which, in the one instance, are of the order of 2000° F. and, in the other, of the order of 3000° F. The ceramic refractories of the uptake and downtake walls, and more particularly the refractories facing the oncoming gases are thus subject to particularly abrupt temperature variations over a wide range. These variations set up high internal stresses in the refractories causing wall damage and consequent additional high furnace maintenance costs.

The present invention provides such uptake and downtake walls that the internal stresses set up by the wide temperature variations of this type of furnace do not have any such damaging effects upon the walls. The downtake and uptake constructions of this invention also result in material savings in fuel costs by the elimination of leakage and the infiltration of air.

In an open hearth furnace construction in accordance with this invention, the gas uptakes and downtakes are arranged with bulkheads formed by sectional panels. These panels are formed by stud tubes which are connected to headers and arranged for the passage of a cooling fluid. The panels are arranged in those portions of the uptakes and downtakes which are subject to the greatest abrasion and impact from gas flow action on the outside of the uptake and downtake walls where the gases are turned and are directed downwardly.

The invention involves the use of fluid cooling in the pertinent downtake and uptake walls. These portions of the walls are sectionalized in supporting panels formed by the stud tubes and their associated refractory and are therefore particularly adapted for convenient handling. The illustrative wall construction has a ceramic facing of limited thickness and yet it insures a permanence of structural strength and so limits heat passage through the wall that the gases are not unduly cooled, to the disadvantage of the melting and refining action of the steel making operation of the furnace.

Another result attained by the uptake and downtake wall constructions of this invention is that the residual heat storage in open hearth walls is so reduced that the time necessary for allowing the furnace to cool to a working temperature is appreciably reduced.

The construction of the uptake and downtake walls of this invention is such that where it is used in the downtake flue, or when used in the flue in which the wall is operating as a downtake flue, there is accumulated on the refractory face of the wall a thickness of molten or semisolid refractory and metallic particles deposited from the furnace gases. This lining, or inner-wall, assists in maintaining the furnace face at a high temperature and in limiting the heat flow to the wall cooling tubes.

The unexpectedly small heat loss through the furnace wall of this invention, measured in terms of heat or temperature level of the furnace proper, has resulted in noteworthy reduction of fuel and furnace maintenance costs, and a consequent reduction in the cost of steel making.

The use of the stud tube uptake and downtake panels of this invention also provides a construction which can be made in standardized units, easily removable and easily replaced by other units without disturbing adjacent parts. This is another factor which is of no small importance in the production of low cost steel.

The foregoing, and other objects of the invention, together with the means whereby they may be carried into effect, will best be understood from the following description, the latter having reference to the accompanying drawings. It will be understood, however, that the particular constructions and adaptations described, and shown have been chosen for illustrative purposes merely, and that the invention, as defined by the claims hereunto appended, may be otherwise practiced without departure from its spirit and scope.

In the drawings:

Fig. 1 is a vertical section of an open hearth furnace, showing the uptake and downtake constructions;

Fig. 2 is a transverse vertical section taken on the line 2—2 of Fig. 1;

Fig. 3 is a plan, or horizontal section, taken on the line 3—3 of Fig. 1;

Fig. 4 is a partial transverse vertical section showing an embodiment of the furnace construction in which the rear wall is upright instead of inclined as indicated in Fig. 2;

Fig. 5 is a diagrammatic view showing a system in which various fluid cooled components of an open hearth furnace are connected into fluid circulation;

Fig. 6 is an elevation of a fluid cooled stud tube door for an open hearth furnace;

Fig. 7 is a vertical section of the door shown in Fig. 6;

Fig. 8 is a plan of the Fig. 6 door;

Fig. 9 is a detail view showing a part of one of the stud tube coils for the Fig. 6 door;

Fig. 10 is a detail view in the nature of a vertical section of the stud tube construction indicated in Fig. 9;

Fig. 11 is a detail view showing the construction at the top of the Fig. 6 door;

Fig. 12 is an elevation of another form of stud tube fluid cooled door for an open hearth furnace;

Fig. 13 is a plan of the door shown in Fig. 12;

Fig. 14 is a vertical section of the Fig. 12 door;

Fig. 15 is a detail view showing the upright stud tubes of the Fig. 12 door;

Fig. 16 is a transverse section of the stud tubes shown in Fig. 15;

Fig. 17 is a detail view in the nature of a vertical section of the header and diaphragm construction at the base of the door shown in Fig. 12;

Fig. 18 is a vertical section on the line 18—18 of Fig. 17 showing the manner in which the diaphragm is constructed and arranged;

Fig. 19 is an elevation of a stud tube door frame;

Fig. 20 is a view largely in the nature of a horizontal section showing a part of the furnace wall including the door jamb and illustrating the association of the stud tubes with the wall and the furnace door;

Fig. 21 is a view in the nature of a vertical section taken on the line 21—21 of Fig. 19;

Fig. 22 is a detail view of the lower parts of the door frame shown in Fig. 19;

Fig. 23 is an elevation of one of the bulkhead stud tube panels for the uptake and downtakes before the application of a ceramic refractory thereto;

Fig. 24 is a side elevation of the bulkhead panel shown in Fig. 23;

Fig. 25 is a view in the nature of a horizontal section of the Fig. 23 bulkhead panel;

Fig. 26 is a detail view showing the relationship of the studs applied to the tubes and the headers of a bulkhead panel involving cylindrical headers;

Fig. 27 is a partial section of the stud tube and refractory furnace wall component before the wall is subject to the operation of the furnace;

Fig. 28 is a view similar to Fig. 27 illustrating the furnace lining or furnace face developed by the action of the furnace gases and their suspended metallic particles upon such a wall component as that indicated in Fig. 27;

Fig. 29 is a longitudinal section of an oil burner construction which is employed in the heating of the illustrative furnace indicated in Fig. 1; and Fig. 30 is a transverse section taken on the line 30—30 of Fig. 29.

The open hearth furnace shown in Fig. 1 of the drawings includes a central section which provides a refractory hearth 10 adapted to support, in the normal operation of the furnace, a pool of molten metal. At a level below the hearth, and at each end of the furnace, there are two independent sets of checkerbrick design to promote the regenerative action of the furnace.

At the right-hand side of the furnace one set 12 of checkerbrick is in the path of combustion supporting air directed thereto through the passageway 14, and adjacent this passageway there is another passageway 16 conducting fuel through the checkerbrick 18.

During the movement of gas and air through the separate passageways 14 and 16 and over the heated checkerbrick at the right-hand side of the furnace the heated gas and air flow from the checkerbrick into a passageway 20 provided by an uptake construction. Here, the fuel and the air are mixed and combustion begins. In the illustrative furnace, additional heat is provided by the operation of an oil burner 22 at the top of the uptake. The gas and air flow around the oil burner and pass along with the burning oil over the pool of molten metal upon the furnace hearth 10.

The combustion gases at the opposite side of the furnace pass through an outlet afforded by a downtake construction 24 which is similar to the uptake construction above described. This downtake construction is provided by walls forming a passageway 26 leading to the separate sets of checkerbrick 40 and 42.

The combustion products at temperatures of the order of 2500° F. to 3000° F. or higher passing through the downtake contact the checkerbrick 40 and 42 heating the brick so that they may in turn heat the incoming air and gas during the next furnace reversal. After heating the sets of checkerbrick 40 and 42 the combustion products pass through the passageways 44 and 46 to outlets 48 and 50 connected to a common flue.

The walls of the uptake and downtake constructions are formed by panels, each panel being constructed of stud tubes 58 and associated headers in the manner indicated in Figs. 23 to 26, inclusive, of the drawings. The stud tubes, tied together by the angles 55, 57, and 59, connect a lower header 56 with an upper header 54, the furnace faces of the tubes and the headers being protected by the studs 60 and 62 associated chromite refractory material molded thereagainst during the construction of the furnace. The upper header is provided with a connector 66 for the flow of a fluid cooling medium through the tubes and a connector 68 is secured to the lower header 56 for the same purpose.

As indicated in Fig. 1 of the drawings the side walls of the uptake and downtake construction are formed by superposed stud tube panels 61, 63, 65, and 67. The end walls 69 (see Fig. 3) being much wider than the side walls 71 and 73 of the uptake and downtake constructions, are provided with a plurality of rows of stud tube panels (for example, two horizontal rows of 3 panels each), the panels being preferably of substantially the same size as those employed for the side walls.

These panels are suitably supported from steel work or other structures, not shown, in such a manner that they can be removed or replaced with a minimum disturbance to adjoining units or furnace structures.

As shown in Fig. 3 of the drawings the front wall of the furnace is provided with a plurality of charging openings normally closed by fluid cooled stud tube doors 70, 72, and 74. Portions of the front furnace wall adjacent the doors are cooled by wall panels 75, 77, 79, 81, and 83, including the stud tubes associated with headers in a manner similar to that referred to in describing the uptake and downtake panels, and arranged to be fluid cooled. The marginal portions of the charging openings are provided with stud tube door jambs or door frames including the square tubes 82' and 84' but otherwise constructed in a manner similar to that indicated in Figs. 19 to 22, inclusive, of the drawings. These door frames, as shown, comprise upright tubes 80 and 82 having studs welded thereto at their furnace sides and refractory material molded around the studs. For the purposes of providing for fluid movement through these tubes, exteriorly of upright plates 81' and 83' there are tubes 84 and 85 connected at their lower ends to headers 86 and 87 as indicated in Fig. 22 of the drawings. The upper ends of these tubes may be connected into a fluid system which will be described below.

The furnace door construction shown in Figs. 6-11 includes the horizontally extending stud tube coil sections 88 disposed within a metallic box-like enclosure 89 and connected into fluid circulation through the inlet 90 and the outlet 90' and re-enforced by the elements 91, 92, and 93. The latter elements also space the tube sections of the coils and take the load when the door is elevated by the lugs 94. Refractory material 95 covers the coils and their studs 96, an access opening 96' being formed therethrough. The access opening 96' is normally closed by a cover plate 96" held in operative position and slidably mounted between the guide plates 96'''.

The refractory material is one capable of withstanding high furnace temperatures and is preferably of the chromite or chrome ore type referred to elsewhere in this description. It is preferably installed as a plastic or semi-plastic, and is pressure molded tightly into position within the box-like enclosure 89 so that after it sets it will be in good heat exchange relationship with the tube sections 88 and the studs 96 which are welded thereto.

The inlet 90 is disclosed as a part of an upright conduit connected to a header extending along the base of the door to the inlet of one of the coil sections, which are connected for series flow to the outlet 90'.

The embodiment shown in Figs. 12-18 of the drawings involves a door of a somewhat different construction. The door is particularly adapted for water conditions which are not all that are desirable, and this door construction is adapted for long continued use under such conditions. This construction involves upper and lower headers 97 and 98 connected by large diameter tubes 99 to 106, inclusive. These tubes have studs welded thereto in order to retain ceramic refractory material which is molded over the furnace faces of the tubes and around the studs, as indicated in Fig. 14.

Referring more in detail to the embodiment shown in Fig. 12 of the drawings, the inlet 107 for the cooling fluid leads to a header chamber 108 which is formed in the end of the upper header 97 by the diaphragm 111. Other diaphragms such as 119-122, inclusive, separate the upper and lower headers into the compartments 110, 112, 114, 116, and 118.

The diaphragms 121 and 122 terminate at a position above the bottom of the header 98 for the purposes of drainage and cleaning. The header may be drained through an opening in the header end wall 127, that opening being normally closed by a plug 128.

The fluid flowing through the inlet 107 to the sub-chamber 108 flows downwardly through the large diameter stud tube 97' and into the sub-chamber 110 of the lower header. From that chamber the flow is upward through the large diameter stud tubes 98' and 99. The fluid subsequently flows through these tubes to the sub-chamber 112 and thence downwardly through the tubes 100 and 101, to the sub-chamber 114 of the header 96.

From the sub-chamber 114 the fluid flows upwardly through the stud tubes 102 and 103 to the sub-chamber 116 and thence downwardly through the tubes 104 and 105 to the sub-chamber 118. From that chamber the flow is upward through the tube 106 to the outlet chamber 120' and then to the outlet 109.

The inlet 107 and the outlet 109 are connected into a fluid system by flexible conduits in order to permit the door to be moved to permit charging the furnace.

The fluid flow through the various tubes of the Fig. 12 door is indicated by the arrows 130-139, inclusive.

The tubes 101 and 102 of the Fig. 12 door are divergently bent at their lower ends around a cylindrical member 140 which is one of the elements arranged to provide an inspection opening 142. This opening is, during a normal operation of the furnace sealed by a closure plate 144 maintained in operative position by the guide flanges 146 and 148 (see Fig. 14). Beneath 140 a bar 145 is welded to tubes 101 and 102.

For moving the Fig. 12 door, lifting mechanism may be connected to the lugs 150—155 which are secured to the upper header 97 in pairs as indicated in Fig. 12.

Figs. 15 and 16 indicate details of the arrangement of studs 160—165, which are preferably resistance welded to the tubes 99 and 100.

When the furnace doors and the bulkhead panels in the gas uptakes and downtakes are installed, a ceramic refractory in a moldable condition is applied over the tube surface, and between the studs extending from those surfaces, this ceramic refractory material is capable of withstanding fairly high gas temperatures, and it is a mixture of various refractory constituents mixed with a fluid binder such as sodium silicate for the purpose of obtaining the desired condition as to plasticity or moldability. The constituency of different batches of refractory mixtures acceptable for the present purpose varies somewhat, but, in general, the percentage range of the constituents is approximately as follows:

|  | Per cent |
| --- | --- |
| Silicon dioxide | 9 to 15 |
| Iron oxide | 12 to 18 |
| Aluminum oxide | 11 to 16 |
| Chromic oxide | 40 to 50 |
| Magnesium oxide | 10 to 18 |

The studs, or other metallic extensions upon the fluid cooled tubes of the doors, door frames, and uptake and downtake walls, conduct heat from the refractory material, and maintain a temperature gradient from the tube wall outwardly to the wall face exposed directly to the furnace gases, such temperature gradient being determined by the spacing, length, and thickness of the extensions, the thermal conductivity of the refractory material, the emissivity of the refractory material, the temperature of the furnace gases which affect the wall, the chemical constituency and physical condition of the suspended particles carried by the gases directed toward the wall, the velocity of the gases, and the element of time during which any given set of said conditions or factors prevail. This time element is of particular importance in the operation of open hearth furnaces wherein there is a wide variation of many of the above indicated conditions or factors during the reversals of the operation.

In one of the forms of the stud tube wall shown in the drawings and particularly indicated in Figs. 15, 16, and 23 to 28, inclusive, this wall includes extensions in the form of steel or alloy studs of round section, secured radially to the tubes or headers, and hence arranged so that they diverge outwardly toward the furnace face of the wall.

The successful use of a combined tube and refractory form of furnace wall requires some means to hold the refractory material in its operative position after shrinkage, or after the formation of cracks in the material. One factor that has influenced the displacement of furnace wall refractory is the deposition of a furnace lining resulting from the deposit of solids which are caused to impinge against the wall by the fact that they are carried in suspension by the furnace gases. This lining must be of such a character, or provisions must be made, to the end that the shrinking of this lining should not exert a warping or pulling force upon the refractory when the wall is cooled. Such warping or pulling force would cause a displacement of the refractory which would be essentially the action of mechanical removal.

If the ceramic refractory material originally applied to stud tubes of the gas uptakes and downtakes, and the doors, is of such a chemical constituency, with reference to the chemical constituency of the gases and the suspended solids carried thereby against the stud tube ceramic refractory, that chemical reactions occur, they must be such that they do not excessively reduce the thickness of the deposited stratum over the furnace faces of the stud tubes. If there is such chemical reaction that the initially installed ceramic refractory is melted or eroded away by the furnace action, then there must be compensating depositions of solids from the gases to take the place of the original refractory material which has been lost.

Analysis of the deposited stratum 170, over the stud tubes 172 and 176 and their studs 176—179 (see Fig. 28), indicates that its main constituents consist of iron oxides, one analysis indicating that there is about 14% FeO and about 77% $Fe_2O_3$. This same analysis indicates 3.67% of calcium oxide, 3.03% of magnesium oxide, 4.25% of manganese oxide, and 4.6% of chromic oxide. Thus, it may be seen that the deposited stratum 170 is of a chemical constituency varying greatly from that of the orginally deposited stratum 172. The fact that furnaces involving the illustrative stud tube walls and doors continue to successfully operate after long periods of time at temperatures greatly in excess of 3000° F. accounts for the fact that the operation of such furnaces has indicated a distinct increase in efficiency of steel production due to reduced fuel requirements and higher furnace operating temperatures.

An indication of the unforeseen character of the results attained by the use of the invention is the fact that the heat recovery from the fluid cooled tubes of the uptake and downtake walls is a mere fraction of what it was expected to be when the original installation embodying the invention was made. This actual result, along with increased furnace temperatures and markedly decreased furnace maintenance costs, has resulted in a considerable increase in the efficiency of steel production.

The reasons why the invention produces its proven results may be several. They may be, to some extent, a consequence of the high emissivity of the furnace lining maintained on the stud tube walls of the uptakes and downtakes by the deposits the furnace gases and their suspended solids, and the originally installed chromite refractory subject to the cooling effect of the fluid in the stud tube walls. It may also be in part due to the low degree of thermal conductivity of the furnace lining 170 built up upon the originally installed ceramic refractory of the bulkhead panels.

The new results are partly due to the character of the illustrative furnace walls whereby a substantially impervious wall is maintained, as compared to the leaky refractory wall constructions of the prior art.

Referring again to the particular constructions shown or indicated in the accompanying drawings, attention is invited to Fig. 5 which discloses a fluid system in which the various stud tube components of the illustrative metallurgical furnace may be connected. Here, a set of roof stud tubes 200 and the bulkhead (or uptake and downtake panels) tube sets 202—205, inclusive, are connected into fluid circulation with a separator 208, such as a steam and water drum. The roof stud tubes 210—216 inclusive, connect the headers 218 and 220.

According to the disclosure of the upper part of the system indicated in Fig. 5 of the drawings, the outlet headers of the stud tube bulkhead panels 202—205 and the outlet chamber of the roof header 218, are connected to a conduit 230 discharging into the separator 208. The separated liquid may pass from the lower portion of the separator 208 through lines 232—234 to the pump 236, and the fluid flow is from that pump through the lines 238—239, and 240, and through the valve 242 to the inlet headers of the various bulkhead panels and to the inlet header 220 of the stud tube roof construction. The several valves 250—260 in the lines connecting these various components of the fluid system operate to permit selective control of the system and permit any one of its units to be temporarily disconnected for the purposes of maintenance, or for other purposes.

The lower part of Fig. 5 indicates that that part of the fluid system involves the fluid cooled coils 270—274 for the furnace doors, the inlets of these coils being in communication through valves 276—280 and their adjacent connections with a fluid inlet line 282. The outlet ends of the coils 270—274 communicate, through valves 284—288 and their connections, with the line 290 which leads to the hot well 292. From this point a l'ne 294 leads through a valve 296 to pump 298, the discharge side of which is connected to the line 282.

For the purposes of forcing the same fluid into both fluid systems from the same source, a pump 300 may be operated in conjunction with the pump 298. The inlet of the pump 300 is connected by lines 302—305 and the valve 308 with a source of fluid supply, and the outlet of the pump 300 is connected through a line 310, the valve 312, and the line 314 to the inlet line 240 for the bulkhead panels and the roof construction.

The inlet side of the pump 298 may be supplied through the lines 320—322 and the valve 324 from the outlet side of the valve 308, thereby, under certain circumstances, utilizing the same fluid as that utilized by the roof and bulkhead system.

When it is desired to supply additional fluid to the bulkhead system from the pump 298, the lines 330 and 332 are employed in conjunction with the valve 334 which controls the flow from the hot well 292 and the inlet side of the pump 310.

For the purposes of permitting the discharge of fluid from the separator 308 directly to the hot well 292, lines 340 and 342 are employed in comb'nation with the interposed valve 344.

For the purposes of fluid circulation, water may be supplied from a central pumping plant which also supplies the water to other apparatus in the system. The water may go to the open hearth furnace after it has served some other use in the steel mill, for example, that of descaling. In some cases the water may be used in one part of the furnace before going to another.

It is within the scope of the invention that some of the fluid cooled wall sections of the furnace may act as parts of a preheater. Steam may be formed in the stud tubes in the furnace or roof and the fluid discharged therefrom may pass into a boiler drum.

The removable parts such as the doors and the door frames may act as feed water heaters for low temperature installations.

The pumps for the fluid system are preferably located below the furnace and the supply of fluid to the furnace components takes place through main headers below the furnace. From these main headers the fluid may flow to the tubes and headers of the stud tube constructions for the furnace walls and doors.

The furnace roof construction as it is indicated particularly in Fig. 2 of the drawings is constructed in the form of an arch with the arch headers 218 and 220 resting in saddles or other supports 402 which are secured to the steel work columns 404 and 406. The latter are connected above the arch by the tie rods 408.

The tubes connecting the headers 218 and 220 are preferably provided with studs welded thereto and after the stud tubes are installed, ceramic refractory material is positioned thereon in the manner indicated with reference to the bulkhead panels and the Fig. 12 door. The flow of cooling fluid through the roof tubes, because of the arched construction, must be rapid enough to prevent the accumulation of steam.

The inlet header 220 of the furnace arch may be separated into the sub-chambers 410, 412, 414, and 416 by the diaphragms 420—422 and the outlet header may be correspondingly separated into the sub-chambers 430—433 by the diaphragms 436—438 so that the flow of fluid is from the inlet sub-chamber 410 across to the sub-chamber 430 and then back to the sub-chamber 412. Such reversals of flow continue until the fluid reaches the outlet sub-chamber 433.

Fig. 2 of the drawings also indicates the rear wall 440 as involving the stud tubes 442 properly connected into fluid circulation and having ceramic material provided thereon in the manner above described with reference to the bulkhead panels and the door.

Fig. 4 shows a different embodiment of the furnace construction in which the rear wall 450 is upright, being provided with a row of horizontally extending and superposed stud tubes 452. Otherwise, this embodiment with its arch header 454 and arch tubes 456 is constructed in much the same manner as the rear wall of the Fig. 2 construction.

Fig. 2 also indicates in dotted lines a plurality of uptake or downtake stud tube panels 460—462.

At the left hand side of the furnace indicated in Fig. 2 of the drawings, the top of the door frame is indicated as being provided with a plurality of stud tubes 470—472 with refractory applied thereto in a manner previously described.

Figs. 29 and 30 of the drawings illustrate an oil burner construction in which the heated fluid of the previously described circulatory system flows into a chamber 500 through an inlet 502. From the chamber 500 fluid flows as indicated by the arrow 504 through the opening 506 to a second fluid chamber 508 and thence through an outlet 510 back into the circulatory system. Extending through the chamber 508 is a fuel duct 512 through which oil or other fuel may be heated as it passes into the furnace.

The fluid chamber 500 may be rectangular in cross section as indicated in Fig. 30, and the fuel tube 512 may be arranged centrally of the chamber 508 which is of a circular cross section and has studs 513—515 thereon. The external walls of the combined fluid chambers of the burner are protected by ceramic refractory material 520 applied over the external surface of the chamber and between the studs.

By way of further comparison of the furnace wall lining developed by furnace action upon the refractory originally installed over the stud tubes, Table No. I is given herewith:

| Material | A Percent in original plastic chrome ore (after firing) | B Percent in facing produced in use | Melting point, deg. F. |
|---|---|---|---|
| FeO | 16.00 | 14.73 | 2,587 |
| Fe₂O₃ | | 66.83 | 2,806 |
| Cr₂O₃ | 44.00 | 4.65 | 3,614 |
| Al₂O₃ | 12.00 | | 3,722 |
| SiO₂ | 5.0 | 1.55 | 3,142 |
| MgO | 15.5 | 3.03 | 5,072 |
| CaO | | 3.67 | 4,658 |
| MnO | | 4.25 | ¹ 1,976 |
| P₂O₅ | | .60 | 1,472 |
| Sulphur | | −.01 | |

Melting points of compounds:
$MgO \cdot Al_2O_3$ ——————————3,875° F. (Spinel)
$2MgO \cdot SiO_2$ ——————————3,470° F. (Forsterite)
¹ This is melting point for $MnO_2$—O.

In this table, the vertical column A gives an approximate analysis of the type refractory used in making the installation. Column B is a part of the furnace lining taken from a stud tube bulkhead after a service period of over 240 heats.

The sample from which the analysis, indicated by vertical column B, was developed, has a dull dark grey body carrying numerous small irregularly shaped crystals which are bright grey and which reflect light.

As to a section of the sample from which the analysis of column B was taken, the sample indicated that it might well be divided into three zones, a front zone exposed to the furnace heat, an intermediate zone, and a rear zone. The front zone showed many fine needle shape crystals perpendicular to the surfaces. These are bright steel gray in color. The intermediate zone involves large voids and the material of this zone was sort of a solid dull gray. The rear zone was the same as the back surface.

Comparing the analyses of the two samples, as given in Table I, there is a gain for B of iron oxides. Calcium and manganese also appear in combinations as contrasted with the lack of such compounds in the material of column A. There is loss of chrome, silicon, and magnesia, and a complete loss of alumina. The melting points of the constituents are given in the last column, and it is known that the melting point of the developed lining is in excess of 3300° F.

The FeO of sample A probably was not replaced, as such, inasmuch as the heating gases were oxidizing, and the temperature was above 3300° F. The FeO then either boiled away, or combined with other iron oxides to form $Fe_3O_4$. The complete loss of alumina is understood, inasmuch as it fluxes in the presence of iron oxides, and boils away. Part of it may also have migrated further into the body of the refractory.

During the initial operation of the illustrative open hearth furnace construction, the surface of the uptake or downtake wall against which the furnace gases impinge becomes sticky and it catches particles of dust and other materials which are carried thereto in suspension by the furnace gases. Thus, the calcium and magnesia gains of the developed wall probably result from the dolomite and magnesite additions to the bath, and from the material utilized in different parts of the furnace contacted by the molten metal or the furnace gases. Other gains in the constituency of the developed lining doubtless result from the violent chemical combinations which take place in the bath and the carryover of some of the results of this action to the walls of the downtakes or uptakes. In some instances, there may be the condensation on the walls of vapors carried from the steel baths.

The loss of chrome and silica with part of the magnesia may be attributed to the early spalling of the original refractory composition.

In one installation, the bulkhead walls were installed and the chrome ore refractory was molded into place over the tubes and between the studs on the tubes. Steam was kept on the bulkhead parts for 24 hours and there followed a period of about two weeks before a fire was started in the furnace. This fire was gradually increased over a period of about five days until the furnace was up to operating temperature. A new bottom was then burned into the furnace during the next ten days and, at several times during this burning, the furnace was overheated and the bulkheads reached their maximum temperatures. After the bottom was burned in, a charge of lime, scrap, and pig iron was put in and the furnace started in its normal operation.

During the heating up and burning in period, vent holes in the chrome plastic ore were open, and these openings were maintained during the early steel making period. No spalling was apparent.

After the steel making has been started it is possible that iron oxides and manganese vapors are carried to the bulkhead walls and absorbed by the chrome ore. They may displace the alumina and cause a decrease in the refractory to a point where the cooling of the stud tubes becomes effective. This may leave a mass of high melting point solids forming a sponge which retains further deposited iron oxides and helps to collect other high melting point solids from the furnace gases.

Other factors pertinent to the changes which take place in the refractory material on the bulkhead walls are the ignition loss of the original refractory, the temperatures involved, and the condition of the furnace gases as to oxidizing atmospheres and reducing atmospheres.

When the flame is travelling toward the bulkhead walls, incompletely oxidized metals are carried to the face of the refractory and deposited. Among the metals deposited are iron and manganese. While there is an excess of oxygen in the gases, combustion is not complete at the bulkheads.

When the furnace is reversed, air and water vapors heated to temperatures of the range of 2000° F. by the regenerators, pass over the face of the refractory and the previously deposited oxides. Complete oxidation of the $Fe_2O_3$ occurs with the generation of heat and a rise in temperature occurs at the face of the wall. Inasmuch as the refractory immediately back of the face is at or above 3300° F. and the air at the face is 2000° F., heat will be transmitted to the air, rather than the cooling water.

This reversing action of the open hearth furnace is one of the reasons why the heat pick-up by the water is so low that a furnace may have the major part of its total boundary components include fluid cooled stud tube and refractory walls, and yet be of considerable advantage in lowering fuel requirements and in increasing furnace temperatures.

Another factor of importance in the consideration of the present invention is the emissivity of the materials of the deposited lining. The condition of the faces of installations involving the present invention show that the furnaces using them have been working at the melting point, above 3200° F. The bath temperature is of the order of 2900° F., and probably not over 3000° F. Therefore, with this higher face temperature the emissivity of the refractory on the stud tube surface is increased. This is confirmed by the furnace performance in that it takes less oil to make steel. This is shown over a period of more than six months operation of a furnace wall installed in accordance with the teachings of this invention. Also, in the installation of this wall the furnace melted steel more rapidly because of increased furnace temperatures.

Emissivity, besides being dependent upon the materials employed is also dependent upon temperatures, and in the illustrative type of furnace, the temperatures are dependent upon flame temperatures. The latter is dependent upon B. t. u. release. In the illustrative open hearth furnace heated by oil, the oil is atomized with superheated steam and air at 700° F. It is then burned with air at 2000° F.

To the sensible heat of the fuel and air and the heat of combustion, there must be added the heat of the exothermic reactions of the bath. The heat input will be somewhat as follows:

| | B. t. u. |
|---|---|
| Heat of combustion of fuel | 4,000,000 |
| Sensible heat of air | 1,840,230 |
| Heat in atomizing steam | 242,271 |
| Heat of oxidation | 969,317 |
| Heat from formation of calcium compounds | 62,220 |
| Heat from liquid iron (hot metal plants) | 384,720 |
| | 7,498,758 |

Of all this input, 3,360,300 B. t. u. will be in the gases at the downtakes as sensible heat, and 209,218 B. t. u. in the gases as unburned CO. Radiation and circulating water loss will account for 1,415,773 B. t. u. and 299,950 B. t. u. respectively, total 1,715,713 B. t. u.

The heat generated in the bath is sufficient to balance the heat lost by radiation from the bath, so we may disregard the last three items of heat input.

A limiting factor on flame temperatures in open hearth furnaces is the refractory presenting the furnace faces. When the prior art refractory materials are mounted in paneling arrangements to reduce radiation losses, the refractory often fails. It has been demonstrated that the stud tube constructions of the present invention, when employed on open hearth furnaces, will stand higher temperatures than previously used silica and chrome refractory constructions, and that the radiation losses are materially decreased. Therefore, higher furnace temperatures are obtained and higher degrees of emissivities are consequently obtained. And, with air supplied at many degrees above that possible in other types of furnaces, this emissivity will be greater than in other types of furnaces where stud tube constructions have been employed. In this case, as the furnace temperature increases, the conductivity of the illustrative wall decreases, due to the changing character of the wall and the deposits made thereon. Such conductivity changes would possibly result from glassy material or the glass which constitutes as much as 50% of the silica of the refractory, and the iron oxide up to 10%. The glassy silica and the iron oxides may have a similar reaction in the calcium oxide, magnesium oxide, and other oxides of the illustrative wall.

At this point it is interesting to note that the original installation of the invention was planned for a pick-up of 40,000 B. t. u. per sq. foot per hour, and the results of operation of the installation over a test period showed clearly that the actual heat pick-up in the bulkhead constructions was less than ten per cent of this estimated rate.

In an actual installation of the illustrative open hearth construction, the tubes have been of a diameter of the order of 2 or 2½ in. and they are separated by 1 and 1¼ in. studs, leaving a space of 2¾ in. or more between successive tubes, a space greater than the diameter of the tubes. This means that less than half of the exposed surface is cooled, and this arrangement produced an unexpected phenomenon. This involved non-uniform deposits of refractory from the operation of the furnace, such deposits being thicker at positions between the tubes than at positions directly over the tubes.

The present invention contemplates an open hearth furnace which may be sealed so that it may operate under draft. This has not been possible in prior art practice because of the induction of excessive amounts of cold air into the furnace. This would reduce furnace temperatures and would reduce combustion efficiency. It has been the best practice of the prior art to maintain a balanced pressure at the access openings at the furnace door.

During the refining period the elimination of carbon and undesired vapors can be hastened if the furnace is under draft. Draft reduces the individual vapor pressures and has a tendency to cause an infiltration of air and a cooling of the furnace. However, with the illustrated furnace construction, built entirely of stud tube constructions and paneled on the outside and with the doors sealed, a draft could be carried at the refining period with advantageous results.

In prior art furnaces, positive pressures damaged the refractories greatly and excessive drafts undesirably increased infiltration. The extent to which the second of these objectionable features has affected prior art practice is illustrated by the fact that, in some instances, 50% excess air has been found, due to infiltration. Both of these objectionable features are eliminated by the illustrated construction.

An important factor relating to furnace conditions during the operation of an open hearth furnace is the fact that they are regenerative and reversible. Consequently, for a brief period, for example about 15 minutes, the bulkhead walls are subjected to the impact of the flame from the furnace. The flame and the furnace gases carry vapors of metals or metal compounds against bulkhead wall in their path and, then when the furnace is reversed, the bulkheads are swept by the hot air from the regenerators. Flame is so set that an excess of 4% oxygen is maintained. There are times, however, such as during the lime boil, that the furnace gases may be found to include CO.

Whereas the invention has been described with reference to the details of the particular construction shown in the various figures of the drawings, it is to be understood that the invention is not to be taken as limited to all the details thereof. It is rather to be taken as of a scope commensurate with the scope of the sub-joined claims.

We claim:

1. In an open hearth furnace having a central hearth, and gas uptake and downtake construction walls arranged respectively at opposite ends of the furnace for carrying alternately products of combustion and air for combustion, and means for causing the movement of furnace gases across a pool of metal on the hearth toward and through a downtake, said means periodically reversing the movement of furnace gases; said uptake and downtake constructions having walls disposed in a position to receive the impingement of said furnace gases from said hearth, said walls comprising spaced stud tubing embedded in refractory material of the chromite type, said stud tubing being spaced, so as to exert upon said refractory a cooling effect of generally the same character over the areas of said walls when a cooling fluid is sent through said stud tubing, the spacing of the said tubing and its associated studs being such as to provide specific inequalities of cooling of small area and recurring at relatively small intervals, whereby stability in the surface of said refractory can be achieved.

2. The structure claimed in claim 1 wherein said walls comprise renewable sections of stud tubing and refractory material.

3. The structure claimed in claim 1 wherein said refractory initially consists of silica, iron oxide, aluminum oxide, chromic oxide and magnesium oxide in substantial amounts.

4. In a basic open hearth furnace a wall portion exposed to furnace gases of substantially full furnace heat, said wall portion comprising substantially evenly spaced tubes bearing metallic stud-like projections and carrying cooling fluid, said tubes and studs being embedded in and covered by a refractory material of the chromite type, said tubes being so closely spaced as to exercise with their studs a generally uniform cooling effect over the surface of said wall portion and also a specifically non-uniform cooling on the surface of the refractory exposed to the hot furnace gases in relatively small, recurring, closely spaced areas thereof, whereby a condition of stability can be attained in said refractory during furnace operation, the thickness of the refractory and the initial length of stud-like projections being such as to permit burning back to an equilibrium surface.

5. In a basic open hearth furnace a wall portion exposed to direct impingement of furnace gases of substantially full furnace heat, said wall portion comprising tubes bearing metallic stud-like projections and carrying cooling fluid, said tubes and studs being embedded in and covered by a chromite refractory material, said tubes being so spaced as to exercise with their studs a generally uniform cooling effect over the area of said wall portion with closely-spaced recurring inequalities of cooling of small areas on the surface of the refractory exposed to the hot furnace gases, whereby a condition of stability can be attained on the surface of said refractory during furnace operation, said refractory comprising silica, iron oxide, aluminum oxide, chromic oxide and magnesium oxide in substantial amounts, and said wall portion being exposed to the furnace gases so as to pick up by absorption materials entrained therein, and so as to gain in iron oxide, calcium and manganese, with loss of chromic oxide and alumina, whereby the composition of said refractory changes with use, resulting in a high emissivity coating of higher melting point.

6. The structure claimed in claim 5 in which said wall portion is a movable door, the stud tubing therein having connections for cooling fluid permitting movement of said door.

7. A regenerative open hearth furnace having a hearth, uptakes and downtakes at the ends of the hearth alternately carrying products of combustion and air for combustion, and means for moving gases over the hearth and periodically reversing the movement thereof, wall portions of the furnace subjected to the direct impingement of furnace gases at substantially furnace heats, said wall portions being formed of stud tubing embedded in refractory material comprising silica, iron oxide, aluminum oxide, chromic oxide and magnesium oxide, said tubing being closely spaced, so as to exert a generally uniform cooling effect over the area of said wall portions with closely spaced recurring areas of non-uniform cooling on the surface of said refractory, said refractory during the operation of the furnace being cooled, so that its composition changes by the loss of chromic oxide and alumina and by the gain of iron oxide, calcium and manganese, whereby the refractory is caused to achieve a condition of high emissivity and higher melting point, and also so that the surface thereof can come into a condition of stability, the length of the studs on said tubing and the initial thickness of the refractory material being such as to permit burning back to an equilibrium surface.

8. The structure claimed in claim 1 wherein the said stud tubing has a tube diameter lying substantially between 2 and 2½ inches and studs having a length substantially between 1 and 1¼ inches, the spacing between tubes exclusive of studs being substantially 2¾ inches.

9. In a basic open hearth furnace a wall portion exposed to furnace gases of substantially full furnace heat, said wall portion comprising substantially evenly spaced tubes bearing metallic stud-like projections and carrying cooling fluid, said tubes and studs being embedded in and covered by a refractory material of the chromite type, said tubes being so closely spaced as to exercise with their studs a generally uniform cooling effect over the surface of said wall portion and also a specifically non-uniform cooling on the surface of the refractory exposed to the hot furnace gases in relatively small, recurring, closely spaced areas thereof, whereby a condition of stability can be attained in said refractory during furnace operation, the thickness of the refractory and the initial length of stud-like projections being such as to permit burning back to an equilibrium surface, said stud tubing having a diameter lying substantially between 2 and 2½ inches and studs having a length substantially between 1 and 1¼ inches, the spacing between tubes exclusive of studs being substantially 2¾ inches.

10. A regenerative open hearth furnace having a hearth, uptakes and downtakes at the ends of the hearth alternately carrying products of combustion and air for combustion, and means for moving gases over the hearth and periodically reversing the movement thereof, wall portions of the furnace subjected to the direct impingement of furnace gases at substantially furnace heats, said wall portions being formed of stud tubing embedded in refractory material comprising silica, iron oxide, aluminum oxide, chromic oxide and magnesium oxide, said tubing means closely spaced, so as to exert a generally uniform cooling effect over the area of said wall portions with closely spaced recurring areas of non-uniform cooling on the surface of said refractory, said refractory during the operation of the furnace being cooled, so that its composition changes by the loss of chromic oxide and alumina and by the gain of iron oxide, calcium and manganese, whereby the refractory is caused to achieve a condition of high emissivity and higher melting point, and also so that the surface thereof can come into a condition of stability, the length of the studs on said tubing and the initial thickness of the refractory material being such as to permit burning back to an equilibrium surface, the said tubes being spaced from each other a distance greater than the diameter of a tube but not greater than twice the diameter of a tube and bearing studs which are less in length than half the spacing between tubes.

GEORGE L. DOW.
CHARLES R. FON DERSMITH.
ARTHUR R. WAUGAMAN.